Figure 1:
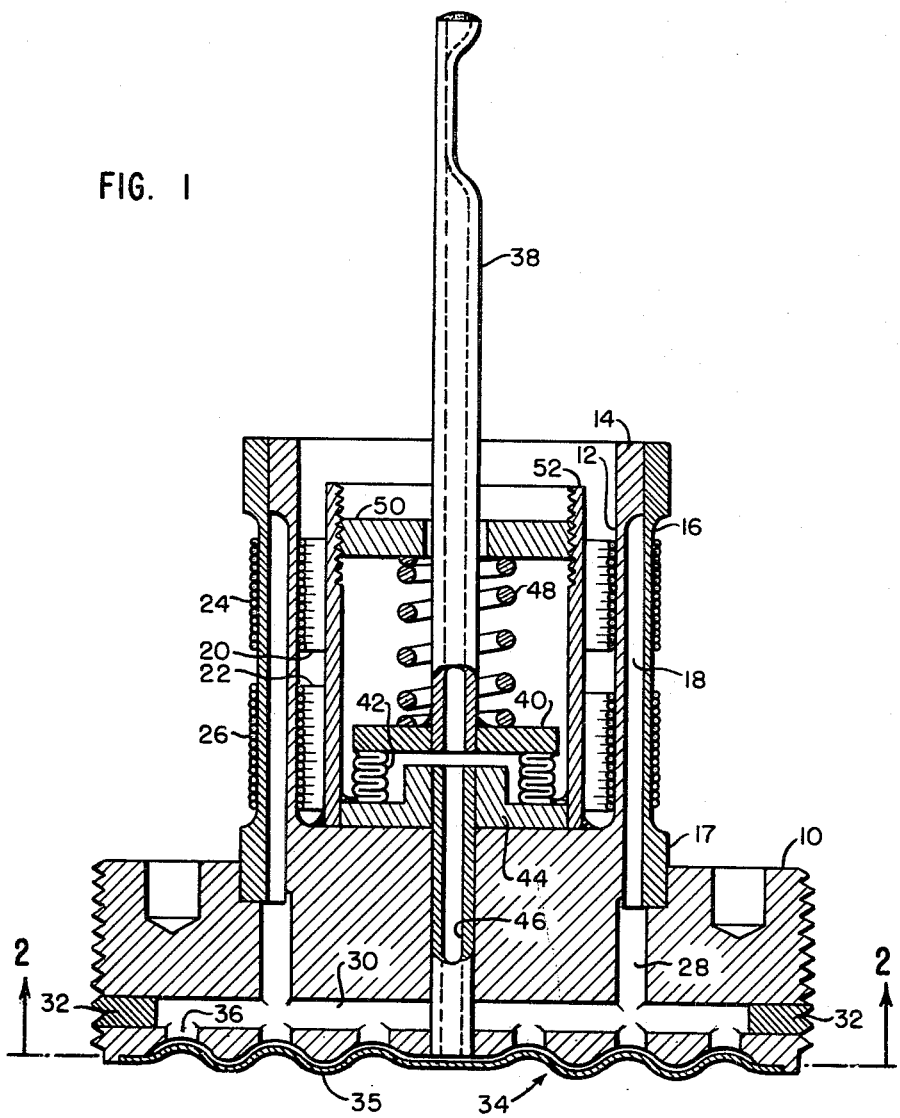

United States Patent Office 3,180,154
Patented Apr. 27, 1965

3,180,154
STRAIN GAGE FLUID PRESSURE SENSING
TRANSDUCER
Yao Tzu Li and Shih Ying Lee, both of Huckleberry Hill,
Lincoln, Mass.
Filed Dec. 18, 1961, Ser. No. 160,014
7 Claims. (Cl. 73—398)

This invention relates to strain gage transducers, and more particularly, to a novel and improved fluid pressure sensing transducer of the strain gage type.

Fluid sensing transducers of the strain gage type are, of course, well known. An advanced transducer of this type is described and claimed in our copending application Serial No. 92,653, filed March 1, 1961, now abandoned, of which the present application is a continuation-in-part. The transducer of our aforementioned copending application provides several advantages over prior devices in that it will provide a larger output signal, is lightweight and compact, will withstand acceleration forces in amounts which commensurate with present day uses of such transducers, is capable of being cleaned to maintain it free of contaminates, and is of relatively simple and economical construction.

However, there are additional problems presented with transducers of this general type. One of these problems is that such transducers, when provided with a fluid pressure sensing member in the form of a diaphragm or membrane, particularly of the convoluted type, are non-linear especially with respect to temperature changes. In certain installations, it is necessary to provide linearity over a large temperature range; for example, from −100° F. to 350° F. Also, there is the problem of protecting the transducer against transient or even steady-state overload conditions. For example, it is possible that a transducer intended for nominal use up to 1,000 p.s.i. may be subjected to pressures up to 10,000 p.s.i. While various measures may be taken to achieve overload protection of the transducer, these efforts should not affect the performance characteristics of the transducer, and particularly should not reduce its sensitivity or speed of response. Where a diaphragm is used as the fluid pressure sensing member, the diaphragm will be displaced in response to changes of pressure. It is possible to provide a stop for the diaphragm to limit the maximum overload within the transducer. However, the diaphragm will still have to withstand the full overload pressure imposed on it. In order to strengthen the diaphragm, it is possible to make the diaphragm thicker. However, making the diaphragm thicker will undesirablly increase its stiffness. Also, it is desired to provide transducers of the general type concerned having a high natural frequency, on the order to 5,000 c.p.s., and further it is desirable to provide a transducer of the type which will not have any ringing effect after a transient force has been applied.

Accordingly, it is the object of the present invention to provide a novel and improved transducer of the type described which will provide all of the advantages of the transducer of our aforementioned copending application but which, in addition, will represent a solution to the additional problems mentioned above. Included within this object is the provision of such a novel and improved transducer utilizing a diaphragm as the fluid pressure sensing member, and which will eliminate any hysteresis effect in the diaphragm. It is further an object of this invention to provide such a novel and improved transducer which is of small size yet will have improved accuracy of performance, approaching the maximum attained from a force balanced type system but with materially better speed of response.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2:
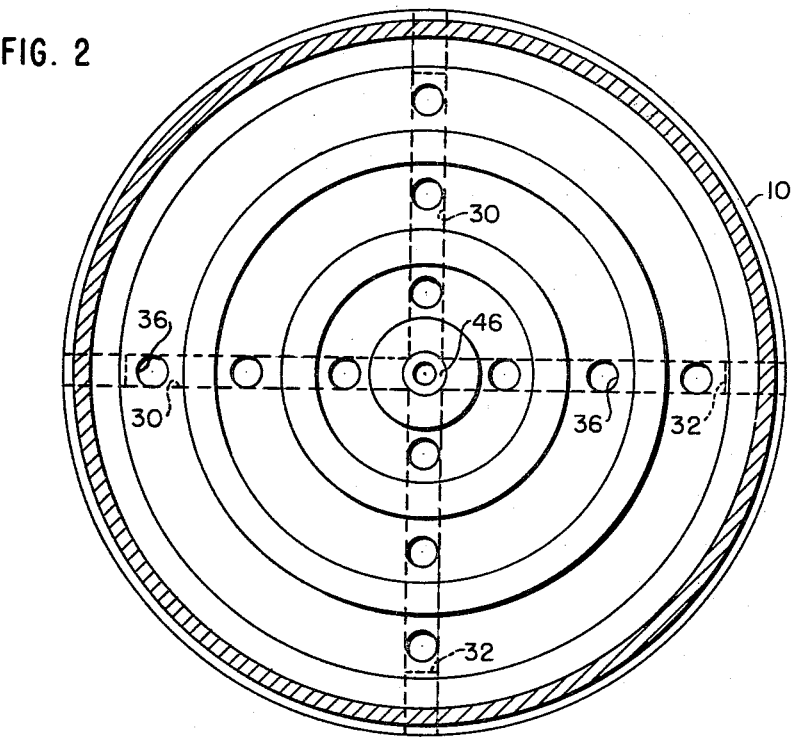
Figure 3:
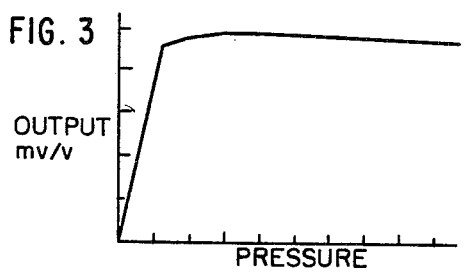
Figure 5:
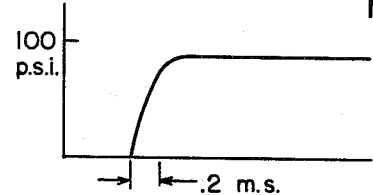
Figure 4:
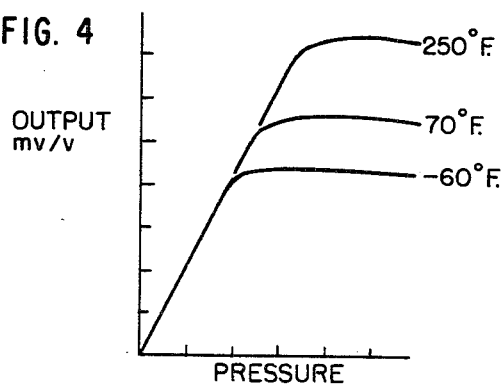
Figure 6:
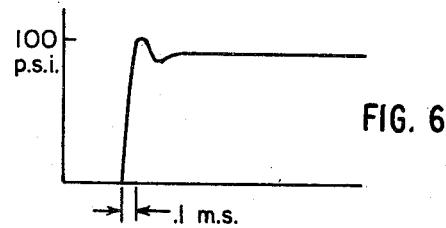

In the drawings:
FIG. 1 is a cross sectional view of a fluid pressure sensing transducer of the strain gage type constructed in accordance with the present invention;
FIG. 2 is a cross sectional view of the transducer of FIG. 1 substantially along the line 2—2 of FIG. 1;
FIG. 3 is a graph exemplifying the overload characteristics of a transducer constructed in accordance with this invention;
FIG. 4 is a graph indicating the linearity of performance and overload characteristics of a transducer constructed in accordance with the present invention and operated at varying temperatures;
FIG. 5 is a graph exemplifying the response and damping of a transducer constructed in accordance with one aspect of the invention; and
FIG. 6 is a graph exemplifying the speed of response and damping characteristics of a transducer constructed in accordance with another aspect of the present invention.

With reference to FIGS. 1 and 2, a transducer constructed in accordance with the present invention comprises a body 10 having a lower, annular, externally threaded portion by which the transducer may be mounted in a threaded aperture. As will be apparent to those skilled in the art, other means of mounting the transducer may be employed without departing from the spirit or scope of this invention. The body 10 further includes a cylindrical, central, slightly raised portion disposed concentrically of the body 10. Extending upwardly from the raised portion is a thin walled strain tube 12 disposed concentrically of the transducer body. The strain tube 12 has an external annular raised portion 14 at its upper end on which is mounted one end of a second or outer strain tube 16. The strain tubes 12 and 16 are in sealed fluid tight relation at their upper ends. The lower end of the tube 16 is provided with an external annular raised portion 17 which is seated in an annular groove in the body 10 and mounted on the body in fluid tight, sealed relation. As shown in FIG. 1, the strain tubes 12 and 16 are spaced apart in a radial direction to provide an elongated annular chamber 18 between the tubes.

A pair of strain gages 20 and 22 are mounted in vertically spaced relation on the inside surface of the inner strain tube 12. A pair of like strain gages 24 and 26 are mounted in vertically spaced relation on the external surface of the outer strain tube 16. The four strain gages are adapted to be connected by electrical leads, not shown, in a Wheatstone bridge arrangement. The purpose and operation of the arrangement of the gages in a Wheatstone bridge is well known and therefore will not be further described. The chamber 18 between the strain tubes is in communication at its lower end with longitudinal passages 28 disposed concentrically of the transducer body. The other end of the passages 28 communicate with a plurality of cross passages 30. As clearly shown in FIG. 2, the cross passages 30 extend radially outwardly from the center of the transducer body and thus radially of the strain tubes 12 and 16. A plurality of plugs 32 seal the outer ends of the cross passages.

A generally circular diaphragm 34 is mounted in sealed relation about its periphery on the base of the body 10 and is disposed concentrically of the strain tubes 12 and 16. As clearly shown in FIG. 1, the diaphragm is provided with a plurality of convolutions 34 which reduce the stiffness of the diaphragm and thus improve the sensitivity of the transducer. The base of the body is, as shown in FIG. 1, provided with a complementary shaped seat for the convoluted diaphragm. A plurality of short passages 36 are provided in the body leading from the cross passages 30. These passages 36 open outwardly of the base of the transducer in registry with the apex of the convolutions of the diaphragm. The space 18 between the strain tubes 12 and 16, the passages 28, cross passages 30 and passages 36 are filled with a suitable liquid, such as silicone oil. Further, the diaphragm, as shown in FIG. 1, is normally spaced from the base of the body 10, and the space between the diaphragm and the body is filled with the liquid.

In order to fill the transducer with the pressure transmitting fluid, a fill tube 38 is provided. The fill tube is disposed concentrically of the strain tube 12 and one end of the tube extends within the strain tube 12. This end of the fill tube is mounted in sealed relation on a plate like member 40 forming the movable wall of a bellows 42 disposed coaxially of the fill tube. The other end of the bellows is mounted in sealed relation on a generally circular plate like member 44 supported in fixed relation on the transducer body. A tube 46 aligned with the tube 38 provides fluid communication between the space within the bellows 42 and the diaphragm 34. As clearly shown in FIG. 1, when the bellows 42 is fully compressed, the adjacent ends of the tube 38 and 46 will be spaced apart with each in communication with the interior of the bellows 42. A coil spring 48 disposed concentrically over the fill pipe 38 urges the end wall 40 of the bellows 42 in a direction tending to compress the bellows. The end of the spring remote from the bellows wall 40 is backed by an annular plate 50 disposed coaxially over the fill pipe 38 in radially spaced relation thereto. The ring or plate 50 is threaded on its external periphery and is threadably engaged with an internally threaded sleeve 52 arranged coaxially over the fill pipe 38 and fixedly mounted on the body 10 of the transducer. Accordingly, by inward threading of the ring 50 the spring 48 will be compressed to preload the bellows 42 for a purpose which will be hereinafter described.

It is believed that the advantages of the transducer herein above described will be apparent from a description of the manner of calibrating the transducer and the mode of operation thereof, as further described below. The internal fluid passages and chambers of the transducer are filled by means of the fill pipe 38. The fluid is introduced through the upper end of the fill pipe which at this time will be open rather than closed as shown in FIG. 1. The strain gages are connected through suitable instrumentation to obtain an indication of the pressure internally of the device. After the transducer, including the fill pipe, has been filled with fluid, the upper end of the fill tube is crimped to seal the fluid within the transducer. The diaphragm is seated on the base of the transducer body in a position corresponding to overload condition of the transducer. The fill tube is then further crimped to reduce the internal volume thereof. This reduction in volume of the fill tube will result in a rise in the pressure of the fluid in the transducer. This rise in pressure will deform the strain tubes in a radial direction and attendantly will provide a strain on the strain gages. The rise in the fluid pressure will thus be reflected in the strain gage instrumentation.

The crimping of the fill tube is continued until an indicator reading is obtained which corresponds to a pressure on the diaphragm slightly in excess of the desired nominal rating of the transducer. Thus, it will be apparent that in later use of the transducer, when the diaphragm 34 is seated on the base of the transducer, the output of the transducer will be at the desired nominal maximum pressure of the transducer and overloading of the strain tubes will be prevented. It will also be apparent that the volume of the fill tubes is reduced. The convoluted base of the transducer provides a conforming support for the diaphragm so that it is supported over the entire surface area exposed to the external pressure thus preventing overload of the diaphragm, particularly beyond its yield point, and eliminating any hysteresis effects caused by such overloading of the diaphragm.

An example of the overload protection provided by the transducer of this invention is shown in the graph of FIG. 3. Here it is seen that the response of the transducer is linear up to the nominal limit of the transducer at which point the output of the transducer becomes substantially constant. The change from the linear output of the transducer during the nominal operating range to the substantially constant output at the overload condition is very sharp, as evidenced by FIG. 3. Where the transducer is utilized in an environment which encounters a marked temperature variation, the volume of the fluid within the device will vary with the temperature to the extent governed by the coefficient of volumetric expansion of the fluid. This may result in inaccuracies in output of the device. Also, at elevated temperatures the expansion of the fluid will raise the signal cut off pressure while the reverse will be true at lower temperatures. In order to keep the variation of the cut off pressure relatively small, the effect of volume change of the liquid with temperature must be maintained very small. This is accomplished to some extent by maintaining the space between the strain tubes relatively small; for example, in the neighborhood of .001". However, when the operating temperature range is quite large, say from $-100°$ F. to $350°$ F., additional measures must be taken. The transducer of the present invention makes provisions for this temperature compensation through the provision of the bellows 42 which provides an expansible chamber in fluid communication with the pressure transmitting fluid within the transducer.

Specifically, the spring 48 is preloaded in an amount sufficient that the bellows 48 will remain collapsed during the calibrating of the device at room temperature, but will upon a rise in temperature of the fluid begin to expand when the pressure of the fluid exceeds a predetermined pressure corresponding to the nominal overload pressure of the device. In this manner, even after the diaphragm has been seated on the body due to an overload condition, a temperature induced increase in pressure either before or after the seating of the diaphragm will not result in over stressing of the components of the device. Rather, the expansible chamber provided by the bellows will expand to accommodate the additional volume of fluid occasioned by the increase in temperature. As shown in FIG. 4, in accordance with this aspect of the invention, it has been found that the signal cutoff range may vary in a device having a 1,000 p.s.i. nominal overload characteristic from 1050 p.s.i. at minus $60°$ F. to 1,400 p.s.i. at $250°$ F.

In addition to the improved accuracy and overload characteristics provided by the transducer of this invention, the device also has a materially improved dynamic response characteristic. The response of the device is quite fast and is approximately equal to the distance from the diaphragm to the outer end of the strain tube chamber 18 divided by the speed of sound within the fluid. For example, assuming a distance of about one inch, the speed of response is approximately $\frac{1}{60,000}$ second. In actual tests the response is about double this due to the elongated passage and the deflection of the tube itself. Such a response speed is sufficiently fast for most applications particularly when the damping characteristic of the device is considered. In this connection, the damping effect of the unit can be adjusted by the size and number of passages 28 leading from the diaphragm to the sensing tube chamber. In this connection, the graphs of FIGS. 5 and 6 illustrate the shock response characteristics of two different configurations. In the embodiment represented by FIG. 5, the damping is approximately equal to critical damping, while in the embodiment of FIG. 6, the damping is approximately .5. The difference in damping between the embodiments represented by FIGS. 5 and 6 is achieved by providing larger or a greater number of openings 28. Also, the unit is completely free from ringing effect and may have a top frequency response up to approximately 6,000 or 7,000 c.p.s.

In addition, the vibration sensitivity of a transducer of this invention is materially improved. The basic unit without any liquid is virtually completely insensitive to vibration along any axis. When filled with liquid, the unit is still completely insensitive to cross axis vibration. The sensitivity to vibration longitudinally of the device is proportional to the pressure head of the liquid column measured from the midpoint of the strain tubes to the diaphragm per gravitational acceleration. This may be as low as 1/100 p.s.i./g, or in other words 1% of the output per 1,000 g for a 1,000 p.s.i. gage. Because of the high damping effect of the distributed fluid mass, the acceleration effect is more greatly reduced at higher frequencies than at lower frequencies. This is contrary to other types of transducers.

The temperature characteristics of the transducer of this invention are in general very good. The temperature transient effect is of course small inasmuch as the diaphragm is very flexible, and the strain tubes are very closely spaced. The result is that a transducer of this type should be particularly useful in measuring temperatures within the combustion chamber of an internal combustion engine by mounting the diaphragm flush with the combustion chamber. From the standpoint of size, a transducer of the present invention may be made quite small; for example, the embodiment of FIGS. 1 and 2 represent a transducer having a diaphragm fabricated from .002" stainless steel with the strain tube assembly being approximately ½" in diameter and one inch long and the fill tube being approximately 1/16" outside diameter and approximately .040" inner diameter. With such a gage utilizing conventional wire strain gages, an output signal of 4 mv./v. is attained which represents the conventional standard sensitivity for a wire strain gage. This was obtained in a gage having a nominal rating of approximately 1,000 p.s.i. However, if a solid state strain gage is used, then the output of the transducer can be as high as 200 mv./v. depending on the temperature requirement. In the manufacture of the transducer, a precipitation hardened stainless steel with a yielding strength of about 200,000 p.s.i. is preferred. This will provide the high strength required in the device and provide an overload capacity many times the nominal rating of the device.

Linearity of response over the working range results from the fact that the sensitivities of the strain gages 20 and 22 vary in opposite senses from the gages 24 and 26. Upon an expansion of fluid in the chamber 18, the outer tube 16 expands and the inner tube 12 contracts. The sensitivity depends on the area of the tube. Thus, as the pressure in the chamber 18 increases the area of the outer tube 16 increases and this results in an increase in sensitivity of the outer gages 24 and 26; since the sensitivity is not constant a non-linearity is introduced into the output of these gages. Under the same increase in pressure the area of the inner tube 12 is reduced and hence the sensitivity of gages 20 and 22 is reduced. In the bridge the overall sensitivity is the sum of the individual sensitivities. Therefore, the variations in sensitivity are balanced out and a substantially linear variation of output with pressure is obtained.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having described our invention, we claim:

1. A fluid pressure sensing strain gage transducer having a nominal overload pressure comprising a body, a pair of concentric radially spaced hollow strain members, strain gages on said strain members, said strain members defining a fluid chamber, means on said body for sensing an externally applied force and transmitting the same to a liquid in said fluid chamber, and including an expansible chamber having a deflectable fluid pressure sensing member, said expansible chamber being in communication with said fluid chamber, a second expansible chamber in communication with said fluid chamber, a liquid filling said fluid chamber and expansible chambers, means resiliently resisting expansion of said second expansible chamber, biasing means for said resiliently resisting means, said biasing means serving to prevent expansion of said second expansible chamber at pressures below the nominal overload pressure.

2. A fluid pressure sensing strain gage transducer having a nominal overload pressure comprising a body, a pair of concentric radially spaced hollow strain members, strain gages on said strain members, said strain members defining a fluid chamber, means on said body for sensing an externally applied force and transmitting the same to a liquid in said fluid chamber, and including an expansible chamber having a deflectable fluid pressure sensing member, said expansible chamber being in communication with said fluid chamber, a bellows in communication with said fluid chamber, a liquid filling said bellows, fluid chamber and expansible chamber, a preloaded spring resisting expansion of said bellows, and means for varying the preloading of the spring, said preloading serving to prevent expansion of said bellows at pressures below the nominal overload pressure.

3. In a transducer as described in claim 2, said bellows having a movable wall engaged by said spring, a fill tube for introducing said liquid into the transducer, said fill tube being mounted at one end on said movable wall and opening into said bellows, the other end of said fill tube being sealed and deformed to reduce the internal volume of the fill tube a selected amount.

4. A fluid pressure sensing strain gage transducer having a nominal overload pressure comprising a body, a pair of concentric radially spaced hollow strain members, strain gages on said strain members, said strain members defining a fluid chamber, means on said body for sensing an externally applied force and transmitting the same to a liquid in said fluid chamber, and including an expansible chamber having a deflectable fluid pressure sensing member, said expansible chamber being in communication with said fluid chamber, a second expansible chamber in communication with said fluid chamber, a liquid filling said fluid chamber and expansible chambers, means resiliently resisting expansion of said second expansible chamber, biasing means for said resiliently resisting means, said biasing means preventing expansion of said second expansible chamber at pressures below the nominal overload pressure, and a fill tube on the body for introducing said liquid into the transducer, said fill tube projecting at one end from the body, said one end of the fill tube being sealed and deformed to reduce the internal volume of the fill tube a selected amount.

5. In a transducer as described in claim 4, said fill tube being mounted for movement with and opening into said second expansible chamber.

6. A fluid pressure sensing strain gage transducer comprising a body, a pair of concentric radially spaced hollow cylindrical strain members, strain gages on said strain members, said strain members defining a fluid chamber, a bellows in communication with said fluid chamber, said bellows being arranged coaxially within the strain members, a deflectable fluid pressure sensing member, said deflectable member being a diaphragm mounted in sealed relation about its periphery on said body and being otherwise spaced from the body to provide an expansible chamber, means on the body providing a seat for the diaphragm, the body having a passage leading from said bellows to said seat, a liquid filling said bellows, fluid chamber and expansible chamber, a preloaded spring resisting expansion of said bellows, said bellows having a movable wall engaged by said spring, means for varying the preloading of the spring, and a fill tube for introducing said liquid into the transducer, said fill tube being mounted at one end on said movable wall and opening into said bellows, the other end of said fill tube being sealed and deformed to reduce the internal volume of the fill tube a selected amount.

7. A fluid pressure sensing strain gage transducer comprising a body, a pair of concentric radially spaced hollow cylindrical strain members, strain gages on said strain members, said strain members defining a fluid chamber, means on said body for sensing an externally applied force and transmitting the same to a liquid in said fluid chamber, and including an expansible chamber having a deflectable fluid pressure sensing member, said expansible chamber being in communication with said fluid chamber, a bellows in communication with said fluid chamber, a liquid filling said bellows, fluid chamber and expansible chamber, a preloaded spring resisting expansion of said bellows, said bellows having a movable wall engaged by said spring, said spring being a coil spring coaxially arranged over said fill tube with one end of the spring engaged with said movable wall, a cylindrical member surrounding said bellows and spring, and a preloading member adjustably mounted on said cylindrical member and engaging the other end of said spring and a fill tube for introducing said liquid into the transducer, said fill tube being mounted at one end on said movable wall and opening into said bellows, the other end of said fill tube being sealed and deformed to reduce the internal volume of the fill tube a selected amount, said bellows and fill tube being disposed coaxially within said strain members.

References Cited by the Examiner

UNITED STATES PATENTS

| 2,841,984 | 7/58 | Green | 73—395 |
| 2,942,219 | 6/60 | McGrath | 73—398 X |
| 3,074,272 | 1/63 | Melton et al. | 73—393 X |

RICHARD C. QUEISSER, *Primary Examiner.*

DAVID SCHONBERG, *Examiner.*